May 27, 1947.  H. SCHAEVITZ  2,421,222
MULTIRANGE LOAD MEASURING APPARATUS
Filed Sept. 10, 1945
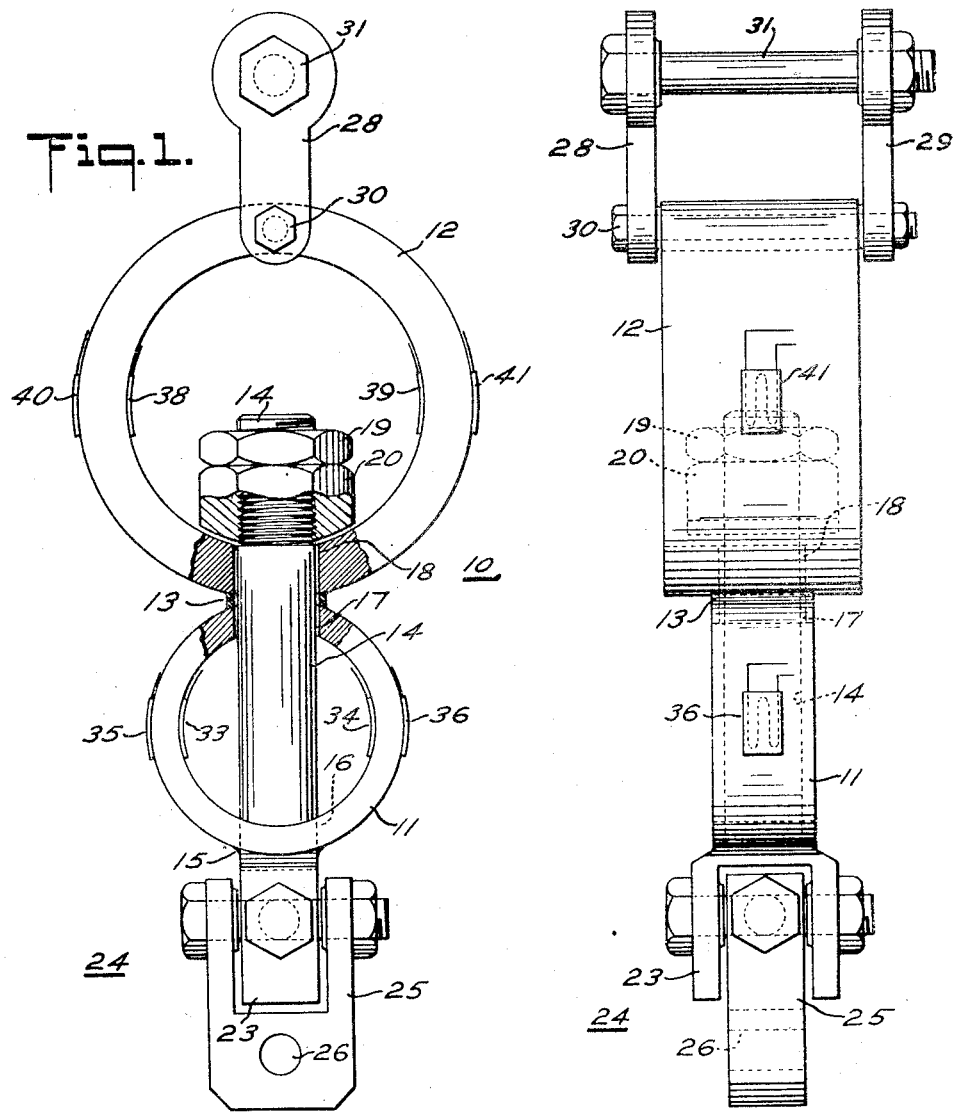
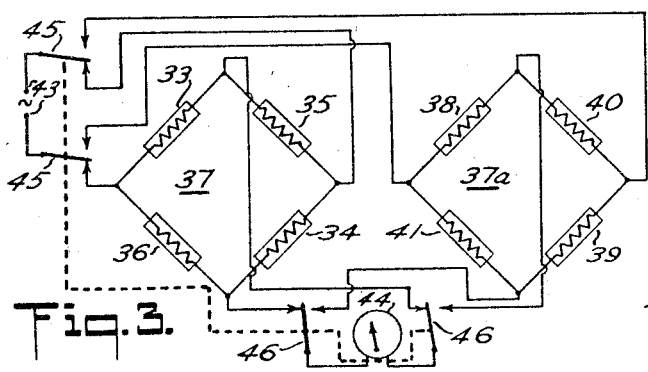
INVENTOR.
HERMAN SCHAEVITZ
BY
ATTORNEY Patented May 27, 1947

2,421,222

UNITED STATES PATENT OFFICE 2,421,222

MULTIRANGE LOAD MEASURING APPARATUS

Herman Schaevitz, Collingswood, N. J., assignor to The Baldwin Locomotive Works, a corporation of Pennsylvania Application September 10, 1945, Serial No. 615,309

4 Claims. (Cl. 73—141)

This invention relates to measuring apparatus such as dynamometers, particularly to dynamometers of the type utilized as weighing devices such as crane scales, and has for an object the provision of a dynamometer having a plurality of load ranges.

Whether the invention be applied to a stationary scale or to a crane, there frequently arises the need to weigh castings or other products of widely differing weight. It has heretofore been necessary to provide a dynamometer selected in accordance with the weight to be lifted or one capable of weighing the maximum load moved by the crane. In accordance with the invention only a single device need be provided because of the extended load range thereof.

In carrying out the present invention in one form thereof, there is provided a multiple range dynamometer in which load responsive devices are successively utilized for measurement of loads of differing range. More specifically, one weight responsive device, provided with strain gages of the bonded wire type will be effective for one load range. As this range is exceeded, a second device will be effective for a higher load range. Additional devices and strain gages may be utilized for still higher load ranges. As transfer is made from one device to the other, means are provided to prevent overloading of the lower load range devices.

For a more detailed explanation of the invention, and for further objects and advantages thereof, reference is to be had to the following detailed description, taken in conjunction with the accompanying drawing in which:

Fig. 1 is an elevation, partly in section, of one form of an improved dynamometer embodying the invention;

Fig. 2 is a side view of the dynamometer of Fig. 1; and

Fig. 3 is a wiring diagram of the strain gages.

Referring to the drawing, the invention in one form has been shown as applied to a multiple range dynamometer 10 which comprises a pair of load responsive elastic members in the form of rings 11 and 12. The ring 11 is welded as at 13 to the ring 12. A load carrying member 14 is welded as at 15 to the ring 11, and extends upwardly through openings 16 and 17 in the ring 11, and through an opening 18 in the ring 12. The upper end is threaded to receive a pair of lock nuts 19 and 20 which may be adjustably secured thereon. The lower end of the ring 11 and the load carrying member 14 is welded to a yoke 23, forming a part of a universal joint 24. The joint is provided with a second yoke 25 having an opening 26 for a load carrying member such as a crane hook or for a cable or other load supporting means. To the upper ring 12 there is provided a pair of links 28 and 29, secured as by a bolt 30 to the ring 12. A load carrying member or crossbar 31 is secured between the links 28 and 29 and is of such a size or diameter that it may be readily carried by a crane hook.

In operation, the dynamometer 10 will be placed on a crane hook, or alternatively suspended from a stationary support by means of the load supporting member 31. The load itself will then be attached to the yoke 25. In this manner, the weight of the load will be applied through the universal joint 24 to the rings 11 and 12. The ring 11 will be vertically elongated by an amount proportional to the magnitude of the load. The elongation or distortion of the ring 11 is utilized to change the electrical resistance of strain gages 33—36. These gages are preferably located on the ring 11 in regions midway of the ring and generally parallel to the vertical axis of the member 14; in other words, the gages are located in the regions where maximum strain occurs in the ring 11. The respective gages are connected in a measuring circuit 37, shown in Fig. 3, to be of the Wheatstone bridge type. Similarly, the ring 12 is provided with gages 38—41, connected in a second bridge 37a. Either direct or alternating current may be supplied to the bridges 37 and 37a from supply terminals 43. The strain gages are preferably of the bonded wire type as disclosed in Simmons Patent 2,292,549. Gages of this type undergo a change in their electrical resistance in response to strain. Accordingly, such a resistance change may be translated in terms of the applied load or force. The respective gages preferably have like or identical initial values of resistance. They are also pre-stressed and hence are responsive to both tensional and compressive forces. Thus, the Wheatstone bridge 37 of Fig. 3 will be balanced in the absence of a load applied to the dynamometer 10. Accordingly there will be no output indicated on the meter 44. However, as a load is applied to the yoke 25, the ring 11 will be vertically lengthened by an amount proportional to the magnitude of the load. The resistance of the gages 33 and 34 will increase because subject to tensional strain, while the resistance of the gages 35 and 36 will decrease because subject to compressional strain. The effect on the bridge 37 is cumulative, this arrangement providing for maximum sensitivity.

If the load on the yoke 25 be sufficiently increased, it will be seen that the lower end or shoulder of the lock nut 20 will be moved into engagement with the inner surface of the upper ring 12. The lock nuts are so positioned on the load carrying member 14 that this engagement occurs prior to elongation of the ring 11 beyond its elastic limit. The movement for direct transfer of the load to ring 12 is of the order of one hundredth of an inch. After factory adjustment of the nuts 19 and 20 they may be tack welded to the load carrying member 14. As the nut 20 engages the inner surface of the ring 12 it will be seen that the load from the universal joint 24 is directly applied to the ring 12, and that no further load may thereafter be applied to the ring 11. Since the ring 12 is larger and heavier than the ring 11, the applied load may be further increased to produce elongation of the ring 12 but not beyond its elastic limit. Accordingly the useful range of the dynamometer 10 is greatly extended or increased. Additionally, protection is provided against application to the ring 11 of a load above its limit of proportionality of stress to strain. Should such a load be applied to the ring 11, the calibration of the dynamometer 10 would be changed and the device would no longer be accurate.

Transfer switches 45 and 46 are provided for simultaneous operation to connect the bridge 37a including the strain gages 38—41 to the source of supply 43 and to the meter 44. The meter itself will be provided with separate scales for each load range or correction may be applied if a single scale meter is used.

In use, a crane may be connected to the crossbar or load carrying member 31, and loads of any size within the capacity of the crane may be attached to the yoke 25. The movement of the load by the crane will not affect the operation of the dynamometer 10 if universal joints such as 24 are used at both the upper and lower ends of the dynamometer. In this case only the vertical components of the load are transmitted to the load supporting member 14. The effect of side sway is eliminated.

It is to be understood that the size of the rings 11 and 12 may be varied in accordance with the load ranges of the dynamometer 10. For example, the ring 11 may be one and one quarter inches in diameter, with a thickness of one eighth inch. The ring 12 may have a diameter of two inches with a thickness of one quarter of an inch. The ring 11 may have a width of one half of an inch, while the width of ring 12 may be one inch. With such dimensions, which are to be taken as suggestive, the dynamometer will have a range of from 0 to 240 pounds for the ring 11, and from 0 to 1200 pounds for the ring 12. By changing the dimensions of the rings 11 and 12, preferably constructed of carbon steel, or from an alloy known as "S. A. E. 4340," other load ranges may be provided, and it is to be understood that additional rings may be added to provide additional load ranges for the dynamometer. The additional rings would be added to the ring 12 in the manner in which the ring 12 has been described in its relation to the ring 11.

While a preferred embodiment of the invention has been described, it is to be understood that other modifications may be made within the scope of the appended claims.

I claim:

1. A multiple range dynamometer comprising a first load responsive member whose strain varies with its load, a second load responsive member whose strain varies with its load, means securing said load responsive members together for simultaneous application of the load thereto, tension means attached to one of said members and extending in spaced relation to the other of said members so as to render one of said members inoperative upon occurrence of a predetermined load applied directly to said member to which said tension means is attached, and bonded wire type strain gages mounted on said members for measurement of the strain thereof as an index of the magnitude of the load applied thereto.

2. A multiple load range dynamometer comprising a load responsive ring whose strain varies with its load, a second load responsive ring whose strain varies with its load, said rings differing dimensionally to provide different load ranges, means for securing said rings together, means for applying a load to said rings diametrically of the region where they are secured together, means carried by one of said rings and operable by a predetermined strain thereof for applying the load directly to the other of said rings and for eliminating further application of said load to said one ring, and bonded wire type strain gages mounted on said rings in regions diametricaly normal to the line of application of said load for measurement of the strain thereof as an index of the magnitude of the load applied thereto.

3. The combination set forth in claim 2 in which a universal joint is provided between said rings and the means for applying a load thereto.

4. A dynamometer of extended range comprising a heavy load carrying ring, a lighter load carrying ring secured at its periphery to the periphery of said heavy ring, means for applying a load to said rings diametrically thereof, means extending from said lighter ring for engaging said heavy ring for direct application thereto of a load above a predetermined magnitude, and load measuring means including bonded wire type strain gages mounted on said rings for producing an indication of the magnitude of said applied load.

HERMAN SCHAEVITZ.

REFERENCES CITED

The following references are of record in the file of this patent:

UNITED STATES PATENTS

| Number | Name | Date |
| --- | --- | --- |
| 28,212 | Squyer | May 8, 1860 |
| 1,436,344 | Hickey | Nov. 21, 1922 |
| 2,252,464 | Kearns | Aug. 12, 1941 |

FOREIGN PATENTS

| Number | Country | Date |
| --- | --- | --- |
| 6,476 | Great Britain | 1903 |

OTHER REFERENCES

Electric Gaging Methods for Strain, Movement, Pressure and Vibration, by Howard C. Roberts, in Instruments, vol. 17, Oct. 1944.